United States Patent
Gott et al.

(10) Patent No.: US 6,675,560 B2
(45) Date of Patent: Jan. 13, 2004

(54) PVC FOOD WRAP FORMED FROM DIOCTYL TEREPHTHALATE PLASTICIZER, METHOD OF FORMING SAME AND METHOD OF WRAPPING FOOD THEREWITH

(75) Inventors: Samuel L. Gott, Kingsport, TN (US); David J. Olsen, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 62 days.

(21) Appl. No.: 09/992,483

(22) Filed: Nov. 26, 2001

(65) Prior Publication Data

US 2003/0014948 A1 Jan. 23, 2003

Related U.S. Application Data

(60) Provisional application No. 60/301,412, filed on Jun. 29, 2001.

(51) Int. Cl.$^7$ .............................................. B65B 43/10
(52) U.S. Cl. ...................................................... 53/461
(58) Field of Search .......................................... 53/461

(56) References Cited

U.S. PATENT DOCUMENTS

| | | | | |
|---|---|---|---|---|
| 2,671,769 | A | 3/1954 | Cowell | 260/31.8 |
| 3,929,867 | A | 12/1975 | McCollum et al. | 260/475 P |
| 5,319,128 | A * | 6/1994 | Dupont et al. | 560/78 |
| 5,427,807 | A | 6/1995 | Chum et al. | 426/393 |
| 6,235,363 | B1 * | 5/2001 | Bilodeau | 428/40.1 |

FOREIGN PATENT DOCUMENTS

| | | |
|---|---|---|
| DE | 31 23 465 | 12/1982 |
| FR | 1.508.345 | 1/1968 |
| GB | 851753 | 10/1960 |

OTHER PUBLICATIONS

Holley Group, Dioctyl Terephthalate, No Date provided, pp. 1–3, source is http://www.china–holleygroup.com/english/chemistry_5.htm.*
DuPont et al., "Degradative Transesterification of Terephthalate Polyesters to Obtain DOTP Plasticizer for Flexible PVC", *Journal of Vinyl Technology* (1993), XP–002216505.
XP–002216507, Mar. 4, 1997, Abstract of Japanese Patent Publication No. 09–058612.
DuPont et al., "Terephthalate Polyester Recycling—a Unique Method Yielding Value–added Products", *Annual Technical Conference—Society of Plastics Engineers* (1991), XP–002216506.
XP–002216508, Sep. 22, 1998, Abstract of Japanese Patent Publication No. 10–251469.

* cited by examiner

*Primary Examiner*—Rinaldi I. Rada
*Assistant Examiner*—Brian D Nash
(74) *Attorney, Agent, or Firm*—Jonathan D. Wood; Bernard J. Graves, Jr.

(57) ABSTRACT

A food wrap formed from polyvinyl chloride, at least one stabilizer, and a plasticizer in an amount of 10–60 parts per hundred parts polyvinyl chloride. The plasticizer may be present in an amount of 30–55 parts per hundred parts polyvinyl chloride. The plasticizer includes dioctyl terephthalate. Dioctyl adipate or another plasticizer may be used with dioctyl terephthalate. In this case, the plasticizer may contain 20 to 80 wt. % dioctyl terephthalate, or more specifically 20 to 60 wt. % dioctyl terephthalate. The food wrap may have a thickness of 1 to 80 mils. According to a method of wrapping food, the food wrap is applied to a food article. According to a method of forming the food wrap, polyvinyl chloride is combined with the plasticizer to form a mixture. The mixture is heated and fused. Then, a film is formed from the fused mixture.

19 Claims, No Drawings

PVC FOOD WRAP FORMED FROM DIOCTYL TEREPHTHALATE PLASTICIZER, METHOD OF FORMING SAME AND METHOD OF WRAPPING FOOD THEREWITH

CROSS REFERENCE TO RELATED APPLICATIONS

This application is based on and hereby claims priority to U.S. Provisional Application No. 60/301,412 filed on Jun. 29, 2001, the contents of which are hereby incorporated by reference.

BACKGROUND OF THE INVENTION

Polyvinyl chloride (PVC) polymers have been used to produce food films for many years. There are only a few plasticizers that have the US Food and Drug Administration ("FDA") approval and performance characteristics needed to plasticize PVC for food wrap applications. The plasticizer used most often to produce these wraps is dioctyl adipate (DOA). PVC compounders are always interested in reducing costs and improving performance.

Performance can be improved by reducing plasticizer volatility. That is, during the production of a PVC film, a portion of the plasticizer may be lost due to its volatility. If there is less plasticizer in the resulting film than desired, the desired physical properties cannot be obtained. Further, if additional plasticizer is used in the process to achieve the desired amount of plasticizer in the resulting film, then costs are increased. After the film is formed, avoiding migration of the plasticizer from the film into the food item can improve performance. Specifically as to reducing costs, one approach to reduce cost is to use a lower cost plasticizer or to blend a lower cost plasticizer with DOA.

SUMMARY OF THE INVENTION

To address the foregoing areas of possible improvement, the inventors propose a food wrap formed from polyvinyl chloride, at least one stabilizer, and a plasticizer in an amount of 10–60 parts per hundred parts polyvinyl chloride. The plasticizer may be present in an amount of 30–55 parts per hundred parts polyvinyl chloride. The plasticizer includes dioctyl terephthalate. Dioctyl adipate or another plasticizer may be used with dioctyl terephthalate. In this case, the plasticizer may contain 20 to 80 wt. % dioctyl terephthalate, or more specifically 20 to 60 wt. % dioctyl terephthalate. The food wrap may have a thickness of 1 to 80 mils.

According to a method of wrapping food, the food wrap is applied to a food article. According to a method of forming the food wrap, polyvinyl chloride is combined with the plasticizer to form a mixture. The mixture is heated and fused. Then, a film is formed from the fused mixture. Before the film can be sold as a food wrap, approval of the U.S. Food and Drug Administration for this use must be confirmed.

DETAILED DESCRIPTION OF THE PREFERRED EMBODIMENTS

The present invention will now be described with reference to embodiments and examples which are given by way of example only, not limitation. As used herein, any given range is intended to include any and all lesser included ranges. For example, the range of 45–90 would include the ranges of 50–90, 45–95, 46–89, etc.

The present invention employs a film formed of polyvinyl chloride with a dioctyl terephthalate (DOTP) ester as a plasticizer. DOTP is the ester of terephthalic acid. DOTP can be used alone or in combination with other plasticizers, such as DOA. The plasticizer may be present in an amount of 10–60 parts per hundred parts polyvinyl chloride resin, (PPH). More particularly, the plasticizer may be present in an amount of 30–55 PPH. If a mixture of plasticizers is used, the mixture may contain 20 to 80 wt. % dioctyl terephthalate, and more particularly 20 to 60 wt. % dioctyl terephthalate. The wrapping film of the present invention has a number of uses but can be employed for hand wrapping various foods and for stretch wrapping them by an automatic wrapping machine.

Wrapping films according to one aspect of the present invention have a sufficiently low brittle temperature, thus allowing them be easily used to wrap refrigerated foods. Wrapping films according to one aspect of the present invention have a sufficiently high gas permeability, so that spoilage of wrapped perishable food can be avoided. Wrapping films according to one aspect of the present invention have a melt index lower than 20. Such a melt index improves film-forming properties and inhibits the formation of pin holes in the film. In addition, before the film can be sold as a food wrap, approval of the U.S. Food and Drug Administration for this use must be confirmed.

According to a method of forming the food wrap, the dry ingredients, such as polyvinyl chloride, are combined. Various stabilizers can be used. These stabilizers can be provided as solid or liquid components. The dry components are mixed and heated, and then the liquid components are added. After further mixing and heating to below the fusion temperature, the mixture is fused using conventional fusing equipment. The film is made from the PVC/DOTP composition at a temperature of 150 degrees to 230 degrees C. by a conventional film-forming method, for example, the T-die method, the inflation method and calendar roller method. The T-die method and the inflation method are described in U.S. Pat. Nos. 2,736,066 and 2,878,521. The wrapping film has a thickness in the range of about 5 to about 100 $\mu$m, more particularly a thickness of 0.5 to 5 mils, and still more particularly a thickness of 10 to 30 microns.

Wrapping films according to one aspect the present invention have sufficient, but not excessive stickiness. To this end, the wrapping film should have an adhesive strength of not less than 20 g/2 cm$^2$ and more particularly an adhesive strength within the range of 200 g/2 cm$^2$ to 700 g/2 cm$^2$. Excessive stickiness results in the following disadvantages. When the film is used to hand-wrap something, its workability is very poor because pieces of the film undesirably adhere to each other. When the film is used for automatically wrapping something, its workability is very poor and the resultant package has a bad appearance, because the film sometimes undesirably winds onto the conveyor rollers due to its high stickiness. Further, an undesirable necking phenomena often occurs when the film comes into contact with trays which receive the articles or food to be wrapped, due to the high adhesiveness of the film to the tray.

Another property related to good workability relates to smooth sliding. That is, the wrapping film should possess a smooth sliding property against rolls of a wrapping machine or against articles to be wrapped. The wrapping film should have a static friction coefficient (ASTM D1894 (1973)) of not more than 0.55.

The wrapping film should also be relatively transparent. More specifically, a transparency such that the total light transmittance is at least 80%, is desired.

EXAMPLES

For the sake of comparison, four PVC films were produced, using several different plasticizer formulations. Specifically, a first PVC film used 100 wt. % DOA as the plasticizer. A second PVC film used 100 wt. % DOTP as the plasticizer. A third PVC film used a plasticizer blend formed from 75% wt. % DOA and 25 wt. % DOTP. Finally, a fourth PVC film used a plasticizer blend formed from 75 wt. % DOTP and 25 wt. % DOA.

Regardless of the plasticizer composition, each of the PVC films was formed according to a similar process. First, the dry ingredients were combined. Referring to Table 1 below, powdered PVC resin sold commercially by Oxyvinyl Corporation under the trade name Oxy 230™ was used. The PVC powder had an internal viscosity IV of 0.95 and a molecular weight factor K of 68. The powdered PVC resin was combined with a solid calcium zinc stabilizer sold commercially by Witco Corporation under the trade name Mark QTS™ to form a mixture. The mixture was blended in a Henschel mixer. With frictional heating, the temperature was raised to approximately 110° F. Then, the liquid ingredients were slowly added. Referring again to Table 1, the liquid ingredients include the plasticizer, DOA, DOTP or a mixture thereof, an epoxidized soybean oil (ESO) and a liquid calcium zinc stabilizer sold commercially by Akzo Chemical under the trade name CZL720™. The mixture was blended until a temperature of 191° F. was reached, at which temperature PVC is below its fusion temperature. This produced a free flowing powder of PVC particles having the other ingredients absorbed therein. The free flowing powder was then fused on a 2 roll mill at a temperature of 290 to 300° F. This produced a fused PVC sheet, which was compression molded into 70 mill sheets. The sheets were then cut to obtain samples, which sample were tested using ASTM procedures. More particularly, the modulus of elasticity and the tensile strength are measured according to ASTM D142. The tear resistance was measured according to ASTM D624, and the brittleness temperature was measured according to ASTM D746.

As can be seen, by replacing DOA with DOTP resulted in a high tensile strength, a similar modulus of elasticity and a similar tear strength. The brittleness temperature was only slightly higher. When a blend plasticizer of DOTP and DOA was used (samples 3 and 4) a brittleness temperature similar to that of the sample 1 DOA film was obtained. The films using the blend of DOTP and DOA exhibited good tensile strength and tear resistance properties. For all three of the films using some DOTP, the tensile strength was greater than that of the film using only DOA.

TABLE 1

DOTP IN FOOD WRAP
FORMULATIONS AND PHYSICAL PROPERTIES

|  | 1 | 2 | 3 | 4 |
|---|---|---|---|---|
| INGREDIENTS |  |  |  |  |
| Oxy 230 Resin (K = 68, IV = 0.95) | 100 | 100 | 100 | 100 |
| DOA | 42 | — | 33.75 | 12.75 |
| DOTP | — | 53.2 | 11.25 | 38.25 |
| ESO | 5 | 5 | 5 | 5 |
| Ca/Zn Stabilizer Mark QTS | 1.5 | 1.5 | 1.5 | 1.5 |
| Ca/Zn Interstab CZL-720 | 1.5 | 1.5 | 1.5 | 1.5 |

TABLE 1-continued

DOTP IN FOOD WRAP
FORMULATIONS AND PHYSICAL PROPERTIES

|  | 1 | 2 | 3 | 4 |
|---|---|---|---|---|
| PROPERTIES |  |  |  |  |
| Mod @ 100% Elong, MPa(S.D.) | 10.81 (0.31) | 10.32 (0.15) | 9.27 (0.13) | 9.36 (0.11) |
| Tensile Strength, MPa(S.D.) | 16.51 (1.22) | 18.22 (0.26) | 18.58 (0.81) | 18.41 (0.24) |
| Tear Resistance, kN/m(S.D.) | 72.8 (1.73) | 72.5 (1.37) | 73.2 (2.77) | 72.7 (2.30) |
| Brittleness Temp, ° C. | −47 | −34 | −48 | −41 |

To examine plasticizer migration from the samples, a loop test was performed. In the loop test, a sample of the material was folded. A 70 mil sample was used, and this is relatively thick compared to the 1 to 5 mil thickness used in food wraps. The folded condition was maintained for a certain amount of time. After this, the film is unfolded and then adsorbent paper is rubbed across the crease. The paper was observed to determine how much plasticizer escaped due to pressure of the relatively thick material being folded.

For each of the formulations, samples were prepared and maintained in the folded condition for day 1 and 1–7 weeks before testing. For week 7, only one sample of each formulation was tested. Table 2 below shows the results of the testing. The samples were ranked on a scale of 0–3. A ranking of zero indicates that there is no migration. A ranking of three indicates that a lot of plasticizer escaped. The plus (+) and minus (−) indications show when the ranking is above or below a whole number ranking. For example, 1+ indicates that somewhat more plasticizer escape than a sample with a 1 ranking.

Loop test migration is not directly related plasticizer migration in a food wrap. That is, food wrap plasticizer migration is not caused by pressure folding a relatively thick material. Nonetheless, the loop test does provide some preliminary indication of plasticizer migration in food wrap.

TABLE 2

DOTP IN FOOD WRAP
LOOP TEST RESULTS

| TEST TIME | SAMPLE 1 100% DOA | SAMPLE 2 100% DOTP | SAMPLE 3 75% DOA 25% DOTP | SAMPLE 4 75% DOTP 25% DOA |
|---|---|---|---|---|
| 1 DAY | 1, 1 | 1+, 1+ | 1, 1 | 1+, 1+ |
| 1 WEEK | 0, 0 | 1, 1 | 0, 0 | 1−, 1− |
| 2 WEEK | 0+, 0+ | 1, 1 | 0, 0 | 1, 1 |
| 3 WEEK | 0, 0 | 1, 1 | 0, 0 | 1−, 1− |
| 4 WEEK | 0+, 0+ | 1+, 1+ | 0, 0 | 0+, 0+ |
| 5 WEEK | 0, 0 | 1+, 1+ | 0, 0 | 0+, 0+ |
| 6 WEEK | 0, 0 | 1+, 1+ | 0, 0 | 0, 0 |
| 7 WEEK | 0 | 1 | 0 | 0+ |

The data shown in Tables 1 and 2 indicates that DOTP can be used to produce PVC films suitable for use as a food wraps.

Tables 3 and 4 show additional samples formulated using the same ingredients as those for Tables 1 and 2. Table 3 uses the same formulations as Table 1. Table 4 uses a lower plasticizer level then than Tables 1 and 3. To perform the Table 1 tests, only 70 mil thick sheets were tested. For Tables 3 and 4, additional tests were performed to analyze the behavior of thin films, such as would be used for wrapping food. Specifically, 20 mil sheets were subjected to a cotton seed oil extraction test, a 1% soapy water extraction test, a hexane extraction test and a carbon extraction test. For the cotton seed oil, soapy water and hexane extraction tests, samples of the films were placed in the various liquids. After a predetermined time period was allowed to elapse, the samples were tested to determine the percentage of weight loss. This weight loss may be attributed to plasticizer migration out of the film. For the carbon extraction test, a disc of the film was heated to a predetermined temperature in the presence of a charcoal/carbon filter. The filter absorbed volatile organic compounds escaping from the heated disc. Again, the results of the test show the percentage of weight loss of the film. The cotton seed oil, soapy water and hexane extraction tests were performed according to ASTM D1239. The carbon extraction test was performed according to ASTM D1203.

For sample 1 of both Tables 3 and 4, DOA, with no DOTP, was used as the plasticizer. For sample 2 of both Tables 3 and 4, DOTP, with no DOA, was used as the plasticizer. For samples 3 and 4, the mixtures of DOA and DOTP were used as the plasticizer, in the amounts shown in the Tables. As can be seen, the samples produced with DOTP performed significantly better in the soapy water and carbon extraction tests. This indicates that the migration of the DOTP plasticizer is significantly less than the migration DOA plasticizer.

TABLE 3

|  | 1 | 2 | 3 | 4 |
|---|---|---|---|---|
| INGREDIENTS |  |  |  |  |
| Oxy 240F Resin | 100 | 100 | 100 | 100 |
| DOA | 42 | — | 33.75 | 12 |
| DOTP | — | 52 | 11.25 | 39 |
| ESO | 5 | 5 | 5 | 5 |
| Ca/Zn Stabilizer Mark QTS | 0.8 | 0.8 | 0.8 | 0.8 |
| Ca/Zn Interstab CZL-720 | 0.4 | 0.4 | 0.4 | 0.4 |
| PROPERTIES |  |  |  |  |
| Mod @ 100% Elong, MPa(S.D.) | 9.66 (0.85) | 10.27 (0.61) | 9.04 (0.69) | 9.39 (0.56) |
| Tensile Strength, MPa(S. D.) | 14.50 (1.06) | 17.26 (1.03) | 13.88 (0.71) | 14.91 (0.41) |
| Elongation at Break, % | 205.0 (17.0) | 254.0 (12.8) | 208.7 (20.5) | 218.9 (28.3) |
| Tear Resistance, kN/m(S.D.) | 67.7 (2.48) | 71.5 (3.48) | 64.6 (3.84) | 67.2 (2.07) |
| Brittleness Temp, ° C. | −41 | −30 | −36 | −30 |
| Torsional Stiffness @ 35000 PSI, ° C. | −43.9 | −36.6 | −41.6 | −34.5 |
| Torsional Stiffness @ 135000 PSI, ° C. | −73.6 | −74.7 | −68.3 | −58.5 |
| Cottonseed Oil Extraction, % weight loss | 9.88 (0.87) | 8.75 (0.55) | 8.34 (1.03) | 6.94 (0.45) |
| 1% Soapy Water Extraction, % weight loss | 0.73 (0.04) | 0.24 (0.07) | 0.55 (0.09) | 0.31 (0.06) |
| Hexane Extraction, % weight loss | 17.04 (0.07) | 19.36 (0.13) | 17.42 (0.99) | 18.12 (0.32) |
| Carbon Extraction, % weight loss | 13.43 (1.18) | 2.28 (0.16) | 9.33 (1.88) | 2.60 (1.58) |

TABLE 4

| | SAMPLE NUMBER | | | |
|---|---|---|---|---|
|  | 1 | 2 | 3 | 4 |
| INGREDIENTS |  |  |  |  |
| Oxy 240F Resin | 100 | 100 | 100 | 100 |
| DOA | 35 | — | 28.5 | 10.75 |
| DOTP 425 | — | 45.6 | 9.5 | 32.25 |
| ESO | 5 | 5 | 5 | 5 |
| Ca/Zn Stabilizer Mark QTS | 1.0 | 1.0 | 1.0 | 1.0 |
| Ca/Zn Interstab CZL-720 | 0.5 | 0.5 | 0.5 | 0.5 |
| PROPERTIES |  |  |  |  |
| Mod @ 100% Elong, MPa(S.D.) | 12.91 (0.40) | 12.58 (0.33) | 12.18 (0.44) | 12.94 (0.43) |
| Tensile Strength, MPa(S.D.) | 20.14 (0.74) | 20.07 (0.35) | 21.02 (0.64) | 20.63 (0.54) |
| Elongation at Break, % | 273.8 (27.3) | 310.9 (24.3) | 317.3 (9.22) | 304.2 (10.89) |
| Tear Resistance, kN/m(S.D.) | 91.8 (4.5) | 88.2 (3.66) | 89.1 (3.9) | 89.6 (4.1) |
| Brittleness Temp, ° C. | −45 | −33 | −43 | −38 |
| Torsional Stiffness @ 35000 PSI, ° C. | −25.5 | −22.2 | −36.6 | −29.1 |
| Torsional Stiffness @ 135000 PSI, ° C. | −57.9 | −47.2 | −78.5 | −59.4 |
| Cottonseed Oil Extraction, % weight loss | 6.01 (1.37) | 7.64 (0.93) | 5.25 (0.95) | 4.93 (0.50) |
| 1% Soapy Water Extraction, % weight loss | 0.87 (0.19) | 0.05 (0.01) | 0.79 (0.09) | 0.22 (0.06) |
| Hexane Extraction, % weight loss | 13.58 (0.04) | 19.60 (0.75) | 14.82 (0.22) | 20.21 (0.21) |
| Carbon Extraction, % weight loss | 11.08 (1.16) | 2.80 (0.15) | 9.87 (1.41) | 5.73 (0.78) |

While the invention has been described in detail with respect to specific embodiments thereof, it will be appreciated that those skilled in the art, upon attaining an understanding of the forgoing may readily conceive of alterations to, variations of and equivalents to these embodiments. Accordingly, the scope of the present invention should be assessed as that of the appended claims and any equivalents thereto.

What is claimed is:

1. A method of wrapping food, comprising applying a polymeric wrap to a food article, the polymeric wrap comprising:
   polyvinyl chloride; and
   a plasticizer in an amount of 10–60 parts per hundred parts polyvinyl chloride, the plasticizer comprising dioctyl terephthalate.

2. A method of wrapping food according to claim 1, wherein the plasticizer is present in an amount of 30–55 parts per hundred parts polyvinyl chloride.

3. A method of wrapping food according to claim 1, wherein the plasticizer further comprises dioctyl adipate.

4. A method of wrapping a food according to claim 1, wherein the plasticizer contains 20 to 80 wt. % dioctyl terephthalate.

5. A method of wrapping food according to claim 1, wherein the plasticizer contains 20 to 60 wt. % dioctyl terephthalate.

6. A method of wrapping food according to claim 1, wherein the food is selected from the group consisting of meats fish, produce, serial, fruit, starchy snacks and prepared foods.

7. A method of producing a food wrap comprising:
   combining polyvinyl chloride and a plasticizer in an amount of 10–60 parts per hundred parts polyvinyl chloride to form a mixture, the plasticizer comprising dioctyl terephthalate;
   heating the mixture;
   fusing the mixture;

forming a film from the mixture; and confirming U.S. Food and Drug Administration approval of the plasticizer for use in the food wrap.

8. A method of producing a food wrap according to claim 7, wherein the plasticizer is combined in an amount of 30–55 parts per hundred parts polyvinyl chloride.

9. A method of producing a food wrap according to claim 7, wherein the plasticizer further comprises dioctyl adipate.

10. A method of producing a food wrap according to claim 7, wherein the plasticizer contains 20 to 80 wt. % dioctyl terephthalate.

11. A method of producing a food wrap according to claim 7, wherein the plasticizer contains 20 to 60 wt. % dioctyl terephthalate.

12. A food wrap comprising:

polyvinyl chloride;

at least one stabilizer; and a plasticizer comprising dioctyl terephthalate in an amount of 10–60 parts per hundred parts polyvinyl chloride.

13. A food wrap according to claim 12, wherein the plasticizer contains dioctyl terephthalate in an amount of 30–55 parts per hundred parts polyvinyl chloride.

14. A food wrap according to claim 12, wherein the plasticizer further comprises dioctyl adipate.

15. A food wrap according to claim 12, wherein the food wrap has a thickness of 1 to 80 mils.

16. A food wrap comprising:

polyvinyl chloride;

at least one stabilizer; and a plasticizer in an amount of 10–60 parts per hundred parts polyvinyl chloride, the plasticizer comprising dioctyl adipate and 20 to 80 wt. % dioctyl terephthalate.

17. A food wrap according to claim 16, wherein the plasticizer is present in an amount of 30–55 parts per hundred parts polyvinyl chloride.

18. A food wrap according to claim 16, wherein the plasticizer contains 20 to 60 wt. % dioctyl terephthalate.

19. A food wrap according to claim 16, wherein the food wrap has a thickness of 1 to 80 mils.

* * * * *

UNITED STATES PATENT AND TRADEMARK OFFICE
CERTIFICATE OF CORRECTION

PATENT NO.    : 6,675,560 B2
DATED         : January 13, 2004
INVENTOR(S)   : Samuel L. Gott et al.

It is certified that error appears in the above-identified patent and that said Letters Patent is hereby corrected as shown below:

<u>Column 4,</u>
Line 26, after "day", change "1and" to -- 1 and --.

<u>Column 6,</u>
Line 59, change "meats fish" to -- meats, fish --
Line 59, change "serial" to -- cereal --.

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,675,560 B2
DATED         : January 13, 2004
INVENTOR(S)   : Samuel L. Gott et al.

It is certified that error appears in the above-identified patent and that said Letters Patent is hereby corrected as shown below:

Title page,
Item [*], Notice, change "62" to -- 0 --.

Signed and Sealed this

Twenty-seventh Day of July, 2004

JON W. DUDAS
*Acting Director of the United States Patent and Trademark Office*